Dec. 7, 1954

L. DAUTREBANDE 2,696,373

APPARATUS FOR THE PRODUCTION OF AEROSOLS

Filed May 28, 1952

INVENTOR.
LUCIEN DAUTREBANDE
BY

HIS ATTORNEYS.

2,696,373

APPARATUS FOR THE PRODUCTION OF AEROSOLS

Lucien Dautrebande, Brussels, Belgium

Application May 28, 1952, Serial No. 290,593

Claims priority, application Belgium May 28, 1951

5 Claims. (Cl. 261—76)

The present invention relates to the production of aerosols by atomization and has for its goal to permit by simple ways the obtention of true aerosols of high quality, that is to say, of small and uniform size, starting from liquids or solids.

This apparatus is characterized essentially in that it comprises a set of concentric sheaths disposed vertically in which the mixture of air and gas and pulverized and/or atomized material circulates successively from top to bottom and from bottom to top, and an upper chamber in which the mixture is finely received and where the smallest particles may escape near the top, while the particles which have not yet attained the desired degree of fineness fall back in such a way as to realize a classification or selection by gravity. The liquid or solid particles not having attained the desired degree of fineness are customarily recycled and led again to the upper part of the system of concentric sheaths in order to be treated again and then again until they have obtained the desired degree of fineness.

In order to make the invention and its mode of realization fully understood, there is described hereafter in an exemplary way one mode of execution, with reference to the annexed single drawing.

The apparatus in accordance with the invention comprises a first sheath 1, which, in the examples shown, forms in its lower part a chamber 2, closed at the bottom and containing the material to be treated.

The sheath 1 contains two other sheaths, 3 and 4, concentric between themselves and to the sheath 1, and forms near the top a chamber 5 in which opens a tube 6 through which escape the aerosols produced by the apparatus.

The sheath 3 joins near the bottom, at 7, the exterior sheath 1 in such a way that the space 8 is not in communication with the chamber 2.

The intermediate sheath 3 is provided near the top with a chamber 9 into which opens a tube 10, which is in connection with a source of compressed air or gas and which contains two nozzles 11 and 12, of which the latter is in connection, by a small tube 13, with the chamber 2 containing the material to be treated.

The nozzle 11 is in connection with the space 8 placed between the exterior sheath 1 and the intermediate sheath 3, for example, by a set of two flexible tubes 14 and 15, between which is placed a junction 16, for example, of glass, carrying a third connection 17, receiving a flexible tube 18 extending to a connection 19 carried by the small tube 13.

The interior sheath 4 ends near the top in a cyclone 20 situated in the chamber 5 and possessing an opening 21 placing it in connection with the interior of the chamber 5.

The operation of the apparatus is as follows:

Under the action of a current of air from the conduit 10, the liquid or solid material contained in the chamber 2 is aspirated by the small tube 13 and penetrates into the conduit 10 at the nozzle 12. The mixture of air and material thus formed is introduced into the chamber 9 and passes from the top to the bottom in the space 24 formed between the sheaths 3 and 4, then from the bottom to the top in the space 25 formed in the interior of the sheath 4.

From the sheath 4 the mixture enters the cyclone 20 and passes through the opening 21 into the chamber 5.

The finest particles escape then from the chamber 5 by the tube 6, while the heavier particles descend by gravity within the sheath 1 (space 8) to be retaken by one of the secondary circuits of aspiration formed by 11—14—16—15, or 12—13—18—16—15.

The particles thus recycled are returned into the chamber 9; they follow the same circuit which has been described above for the freshly atomized particles and are finally led into the chamber 5 where they escape by the tube 6 if they have attained the desired degree of fineness, or descend in the space 8 to be recycled anew.

According to the need, one can, in the examples shown, dispose of the two recycling circuits, or, indeed, retain only one; it suffices to have only one of the flexible tubes 14 or 18. One can also suppress entirely the recycling by acting upon the tube 15.

One of the essential features of the apparatus is that the solid particles are subjected to a selection or classification by gravity, thanks to the fact that the solid or liquid particles introduced into the chamber 5 which are yet of too high a weight fall again into the space 8 and are retaken to be treated again, only the particles of the desired fine size leaving by the tube 6.

One realizes thus an apparatus of simple construction permitting the obtention of true solid or liquid aerosols of a small, uniform size.

One can provide one or two spirals 26 and 27 around the interior sheath 4 and/or within that sheath in order to produce a spiral motion or a turbulence in the current of gas or solid.

These spirals can, however, be left out.

The invention is not limited by the details of realization described, and numerous constructive modifications can be introduced without departing from the scope of the invention.

It is thus that the products to be treated can be contained in a chamber situated in the course of tube 10.

Furthermore, the recycling can be entirely omitted.

I claim:

1. An apparatus for the production of true aerosols starting from solid or liquid materials, comprising an elongated vertical receptacle adapted to hold solid or liquid in the bottom portion thereof, the upper end of said receptacle having an orifice for the escape of dry or liquid aerosols from the receptacle; a tube supported concentrically within said receptacle leaving an annular space between the walls of the tube and the walls of the receptacle with the lower end of said tube terminating short of the bottom of the receptacle, the upper end of said tube being sealed circumferentially to the walls of the receptacle; a conduit for the introduction of compressed gas leading into the annular space between the wall of the tube and the wall of the receptacle; a pipe connecting the bottom of the receptacle and said conduit; a nozzle at the end of said pipe within the conduit; a housing enveloping said receptacle in sealed relationship providing a second annular space between the walls of the housing and the walls of the receptacle and forming a chamber around the upper end of said receptacle; and a discharge duct leading upwardly from the housing.

2. An apparatus according to claim 1 in which is provided a second pipe connecting the housing and the conduit thereby providing communication between the second annular space and the conduit.

3. Apparatus for the production of true aerosols starting from solid or liquid materials, comprising an elongated vertical receptacle adapted to hold liquid or solid in the bottom portion thereof, the receptacle having an upper vortical portion with an orifice near the apex thereof; a tube supported concentrically within said receptacle leaving an annular space between the walls of the receptacle and the walls of the tube, the upper end of said tube being sealed circumferentially to the walls of the receptacle at a point below the upper vortical portion of the receptacle and the lower end of said tube terminating short of the bottom of the receptacle; a conduit for compressed gas leading into the annular space between the walls of the tube and the walls of the receptacle at a point near the jointure of the tube and the receptacle; a pipe connecting the bottom portion of the receptacle and said conduit; a nozzle at the end of said pipe within said conduit; a housing enveloping the receptacle leaving a second annular space between the housing and the walls of the receptacle and providing a chamber surrounding the upper vertical portion of the receptacle; and a discharge duct at the top of the housing.

4. An apparatus according to claim 3 in which the tube and the annular space between the tube and the walls of the receptacle are provided with spiral baffles.

5. An apparatus according to claim 3 in which a second pipe connects the housing and said conduit thereby providing communication between the second annular space and the conduit.

References Cited in the file of this patent

UNITED STATES PATENTS

| Number | Name | Date |
|---|---|---|
| 2,330,297 | Lynch | Sept. 28, 1943 |
| 2,396,204 | Robinson | Mar. 5, 1946 |
| 2,437,592 | Brown | Mar. 9, 1948 |